UNITED STATES PATENT OFFICE.

LEONARD PAGET, OF NEW YORK, N. Y., ASSIGNOR TO THE RELIANCE LAMP ELECTRIC COMPANY, OF NEW JERSEY.

OXIDANT FOR ELECTRICAL BATTERIES.

SPECIFICATION forming part of Letters Patent No. 631,322, dated August 22, 1899.

Application filed July 8, 1897. Serial No. 643,805. (No specimens.)

*To all whom it may concern:*

Be it known that I, LEONARD PAGET, a citizen of the United States, residing at New York, in the county of New York and State of New York, have made a new and useful Invention in Oxidants for Electrical Batteries, of which the following is a specification.

My invention is directed particularly to improvements in the oxidant for electric batteries in which the same is obtained by the peroxidation of lead. It has been observed by Planté and other observers that the positive (charging) electrode of a storage battery constructed with metallic lead positive (charging) electrodes is in more or less active condition as its color is darker or lighter, that color described as puce-black being indicative of a more effective oxidation than is a chocolate-brown color and this in turn more effective than the light-brown color which is observed on more or less discharged positive plates. I have observed and found that the degree of oxidation as ascertained by chemical determination of the oxidizing effect of a given weight of oxids of lead of differing colorations varies with the intensity or depth of coloring; and it is the object of my invention to attain the oxid of the deepest black coloration, and I claim the same as a product whatever may be its chemical formula, understanding that I do not claim an oxid possessing a chocolate-brown coloration which is indicative of the degree of oxidation recognized chemically as $PbO_2$ and which is that oxid constituting the bulk of the oxidant in the positive (charging) electrode of an ordinary storage battery.

It is therefore the object of my invention to produce an oxidant in a storage-battery electrode having throughout its entire mass the highest possible degree of oxidation, and I claim such product as constituting this entire or practically entire mass and not as a constituent with other oxids in a small proportion of the entire mass of the oxids available as oxidants. I am aware that such high oxidation as I claim as constituting practically the entire mass of the oxidant of my positive (charging) electrodes has been recognized as a minor constituent of the mass of oxidant (generally in superficial position;) but herein my invention differs, as previously explained. The chemical constitution of such oxidant has been declared to be $Pb_2O_5$ or $H_2Pb_2O_7$; but acceptable authority for such distinction is wanting. The initial electromotive force of this oxidant, supported on the base of metallic lead, from which it is formed, and in relation to an anode of zinc in concentrated sulfuric-acid (40 B.) solution is 2.6 to 2.7 volts. I obtain this oxidant on and in the mass of a positive electrode for a battery by causing a lead plate, grid, or mass to become the anode in an electrolytic cell containing an electrolyte the main active constituent of which is the highest oxidizing medium known to chemical science, and I prefer for this purpose a solution of perchloric acid or peroxid of chlorin. I prepare peroxid of chlorin in the following manner: A solution of potassium chlorate is decomposed with hydrofluosilicic acid and the solution decanted. This solution of chloric acid is evaporated at boiling heat, and when the greater part of the water has been boiled off the remaining liquid is introduced into a retort and distilled. During distillation the remaining water first passes off and is rejected. The water is followed by a heavy oily liquid, which is $HClO_4$, $2H_2O$. This is mixed with four volumes of strong sulfuric acid and again distilled, when the pure perchloric acid ($HClO_4$) first passes over as a yellow watery fluid. The diluted acid is permanent as compared with the undiluted acid. In order to render the oxid of lead produced (for it otherwise generally occurs as a very hard black mass) molecularly permeable to any subsequent as well as to the "forming" electrolyte, I add to this electrolyte a salt of magnesium and, to increase the conductivity, a solution of sulfuric acid. The oxidation of the lead anode (positive electrode) in relation to a cathode of lead in such an electrolyte is effected at a potential difference of three volts and cannot be effected below 2.75 volts. Under such conditions the mass of metallic lead is converted into a coherent mass of the higher oxid, having 1.6 times the volume of the original lead and of an intensely-black coloration. The electrolyte I prefer is composed as follows: perchloric acid, four per cent.; sulfuric acid, twentyseven per cent.; water, sixty-nine per cent., in which is dissolved five per cent. of oxid of magnesium. I find that a suitable strength of current is one-fourth to one-half ampere per square inch of the lead anode submitted to treatment in such electrolyte. This high oxid thus obtained I term "superoxid of lead," and I am not aware that lead superoxid of this intense blackness and high degree of oxidation can be produced as an integral mass by any other process or method than that herein described.

I am aware that Luckow has described a "bluish-black-brown" superoxid of lead as obtained by the electrolysis with lead electrodes of a very weak solution (whose ions are therefore nearly wholly dissociated) with a comparatively weak current, (one ampere to two or three square decimeters of anode;) but this state of oxidation is inferior to that obtained by my process and is produced only in solutions containing not more than 1.5 per cent. of free acid, these solutions having, therefore, but low conductivity and the formation proceeding with great slowness as compared with the rapidity of my process.

I do not limit myself to the use of this oxidant for storage batteries, but wish to be understood as claiming it broadly as an oxidant or depolarizer in connection with batteries of all kinds whether primary or storage.

Having thus described my invention, what I claim, and desire to secure by Letters Patent of the United States, is—

1. The method of manufacturing positive electrodes for storage batteries, which consists in placing a mass of lead of convenient form in an electrolyte consisting essentially as to its active agent of a peroxid of chlorin, dissolved in a strong solution of sulfuric acid of good conductivity, making this said mass the anode for an electric current, and adjusting the said current so that a potential difference of about three volts is established between said anode and a cathode of lead.

2. The method of manufacturing positive electrodes for storage batteries, which consists in placing a mass of lead of convenient form in an electrolyte consisting essentially as to its active agent of a peroxid of chlorin and containing also a salt of magnesium and a solution of sulfuric acid, as and for the purposes described; and making this said mass the anode for an electric current, which current has a potential difference of about three volts between said anode and a cathode of lead.

In testimony whereof I have hereunto subscribed my name this 7th day of July, 1897.

LEONARD PAGET.

Witnesses:
O. T. BUGG,
C. J. KINTNER.